United States Patent [19]

Wong

[11] Patent Number: 4,942,807
[45] Date of Patent: Jul. 24, 1990

[54] TURNING MECHANISM

[76] Inventor: Don M. Wong, 2296 Bunker Hill Dr., San Mateo, Calif. 94402

[21] Appl. No.: 312,368

[22] Filed: Feb. 14, 1989

Related U.S. Application Data

[63] Continuation-in-part of Ser. No. 140,176, Dec. 31, 1987, Pat. No. 4,820,054.

[51] Int. Cl.$^5$ ............................ A47J 27/00; B01F 7/14
[52] U.S. Cl. ........................................ 99/348; 99/409; 414/758; 414/764; 414/781; 414/783; 426/523; 366/241
[58] Field of Search ............. 99/348, 409, 419, 421 R, 99/421 H, 396, 397, 398, 321, 331; 366/279, 241; 426/523; 414/758, 764, 768, 767, 781, 783

[56] References Cited

U.S. PATENT DOCUMENTS

| | | |
|---|---|---|
| 244,576 | 7/1881 | Fiederlein . |
| 277,876 | 5/1883 | Brown . |
| 512,232 | 1/1894 | Smith . |
| 2,543,403 | 2/1951 | Duval ................................ 414/764 |
| 2,905,451 | 9/1959 | Callanen . |
| 3,752,057 | 8/1973 | Groen, Jr. . |
| 3,905,585 | 9/1975 | Wallman . |
| 4,177,721 | 12/1979 | Redhead ............................ 426/523 |
| 4,199,266 | 4/1980 | Giusti . |
| 4,436,432 | 3/1984 | Drocco . |
| 4,439,044 | 3/1984 | Buttiker . |
| 4,503,502 | 3/1985 | Chapin . |
| 4,534,658 | 8/1985 | De Vries . |
| 4,544,281 | 10/1985 | Wilkinson . |
| 4,571,091 | 2/1986 | Pardo et al. . |
| 4,575,255 | 3/1986 | Kafka . |
| 4,588,301 | 5/1986 | Bolz . |
| 4,649,810 | 3/1987 | Wong . |

*Primary Examiner*—Robert W. Jenkins
*Attorney, Agent, or Firm*—Townsend and Townsend

[57] ABSTRACT

An apparatus for stirring cooking ingredients in a vessel or for automatically turning a food item such as a steak or roast provides a stirring or turning action having horizontal and vertical rotation. In one embodiment the horizontal and vertical rotation have a pre-determined time relation to one another such that a spatula portion of the stirring apparatus flips over the ingredients a predetermined number of times as the spatula rotates once horizontally about the vessel. The horizontal rotation action is also used for automatic turning. The turning apparatus includes a rigid bar rotatable with the horizontal axis and a supporting structure such as a wire cage or food-piercing tine structure for supporting the food during turning. The rigid bar and food-supporting structure are connected by flexible links such as steel fiber. The rotating bar drags the food item over or about the rotation axis to effect the turning action. The apparatus is especially suited for use in an automatic cooking system.

17 Claims, 9 Drawing Sheets

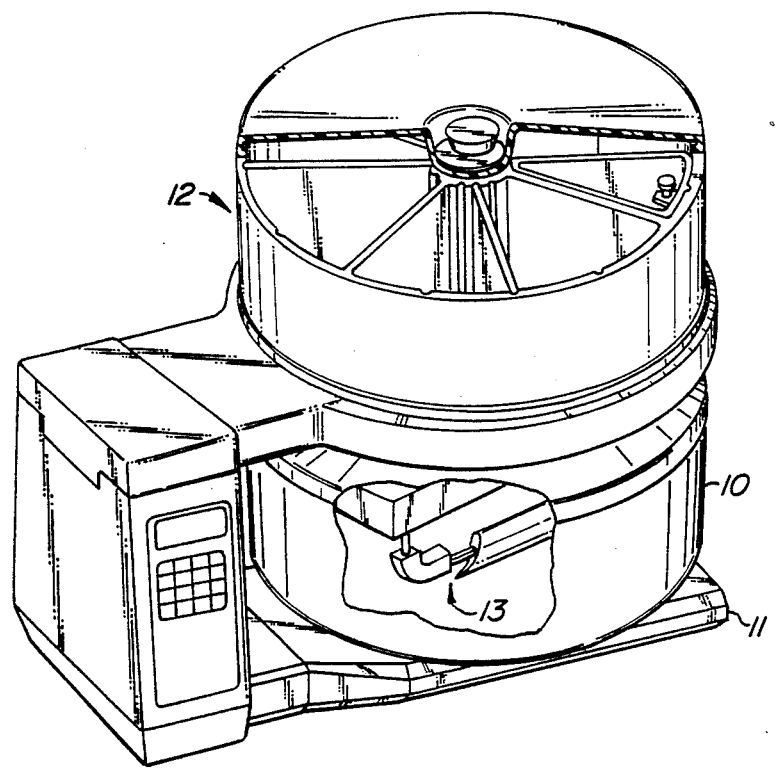
FIG._1.

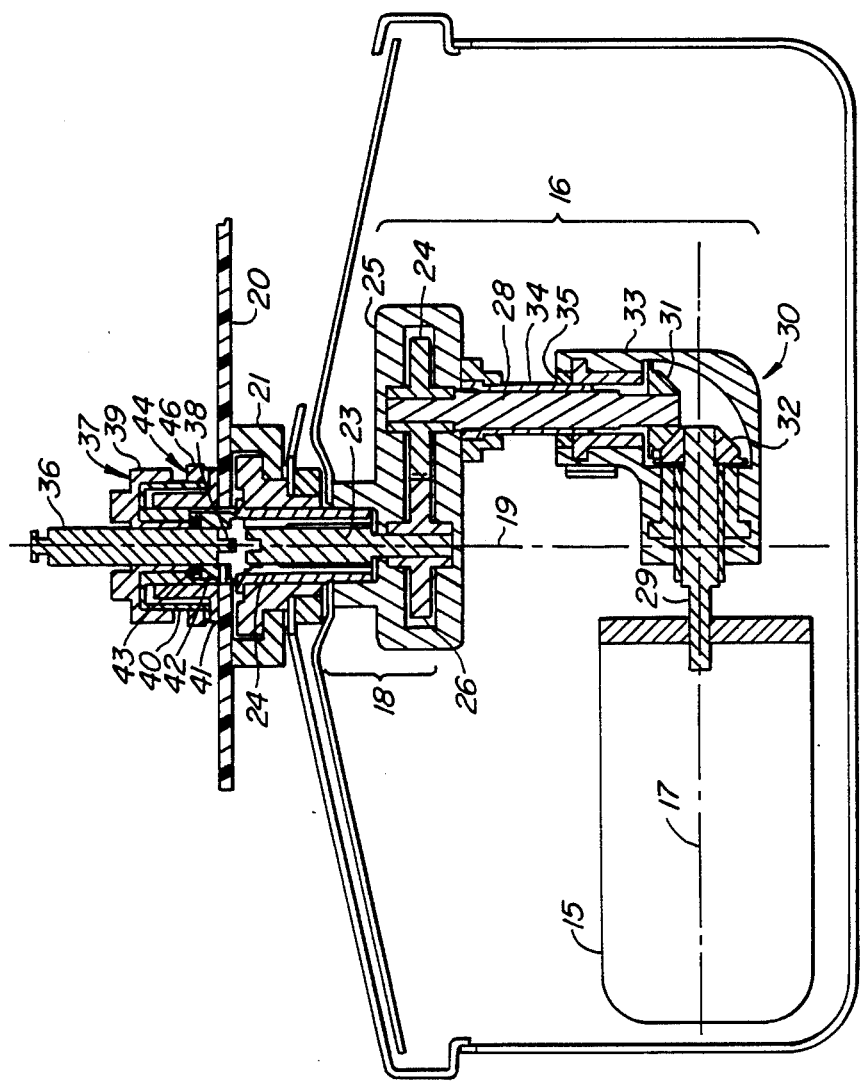
FIG._2.

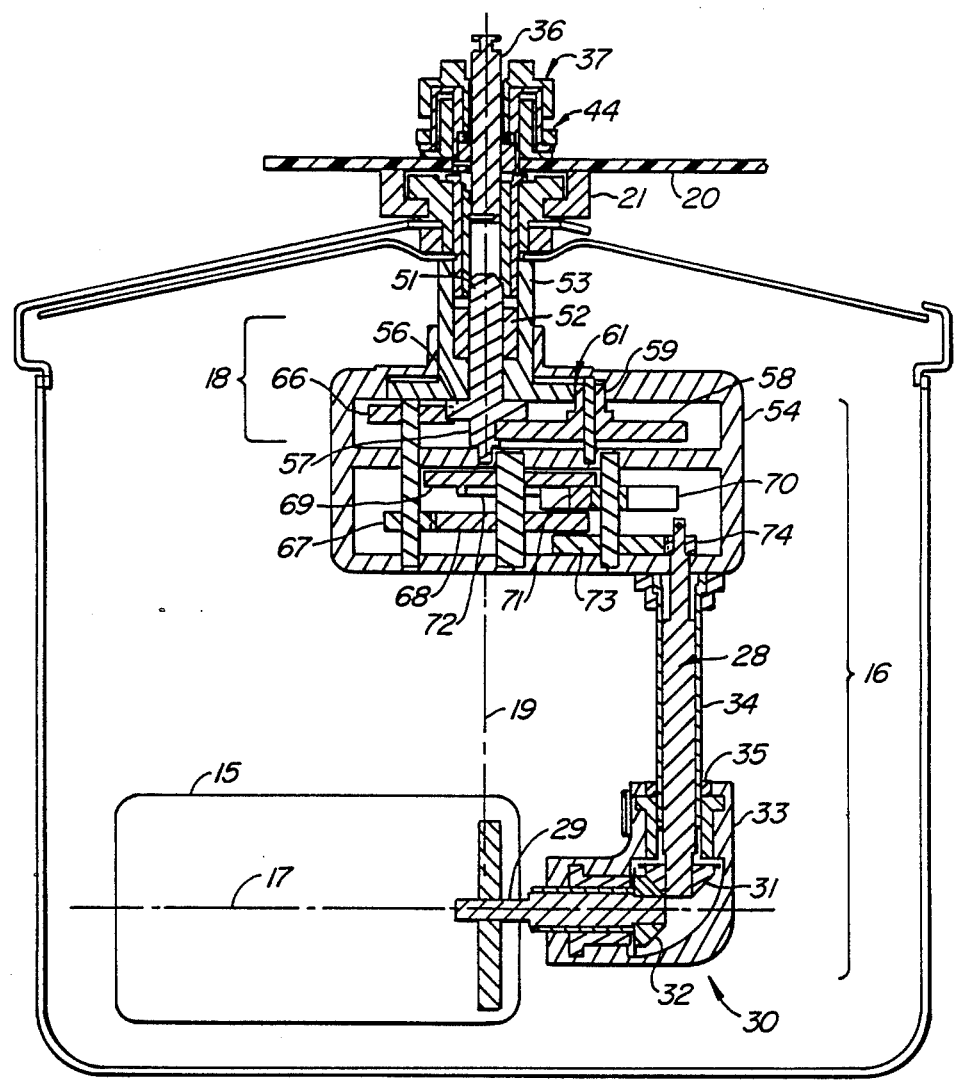
FIG._3.

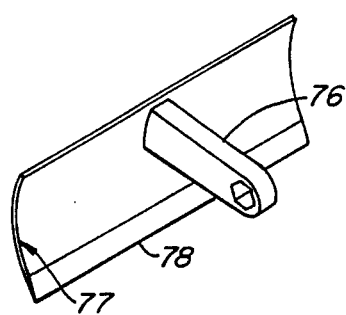
FIG._4.
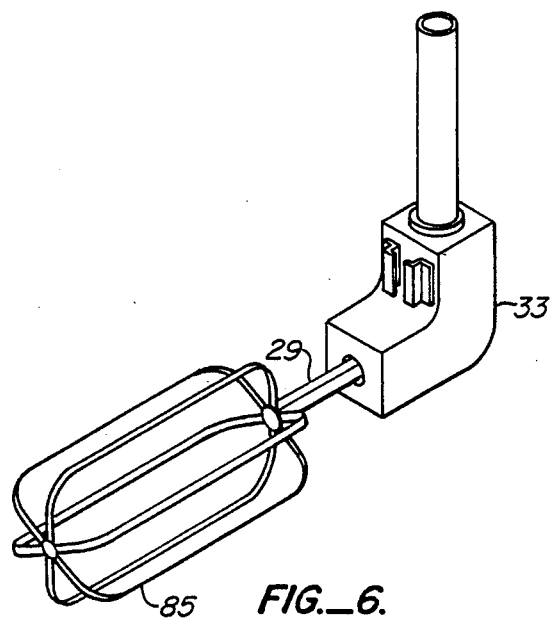
FIG._6.
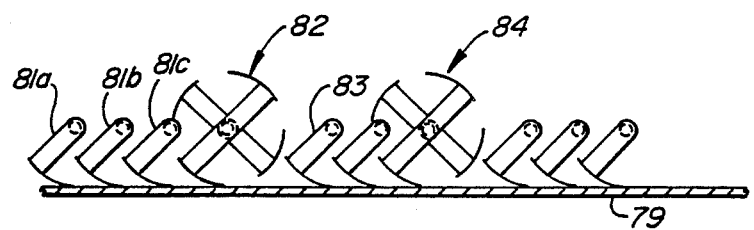
FIG._5.

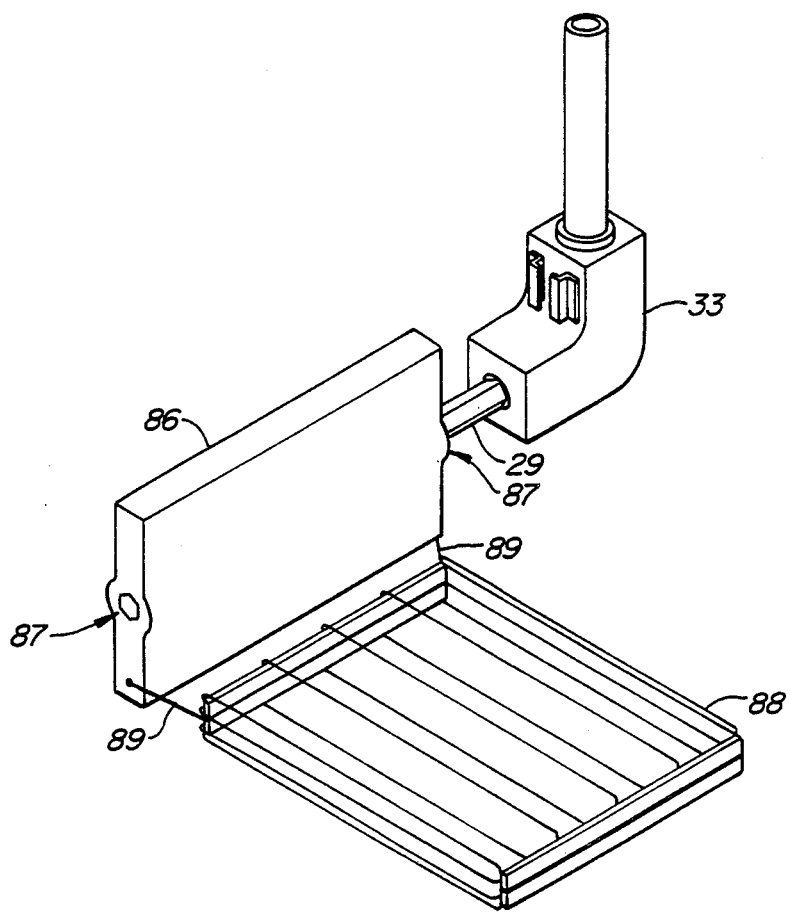
FIG._7.

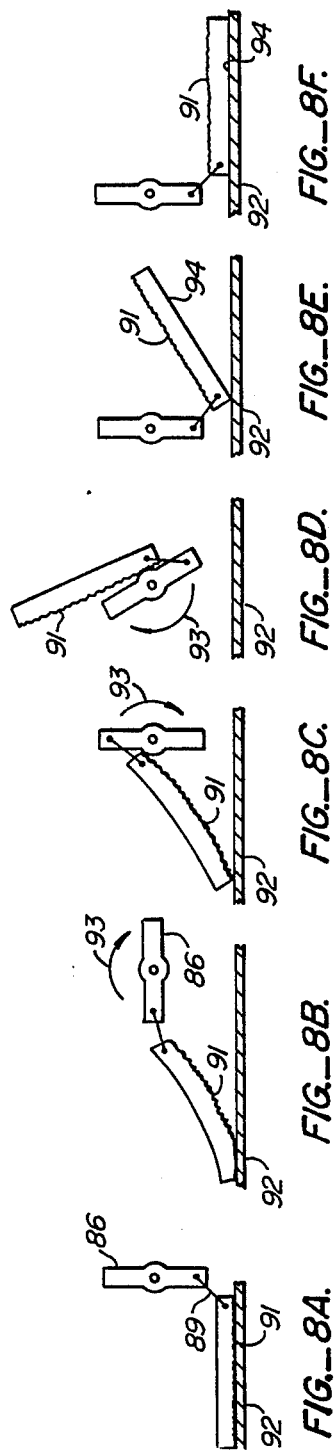

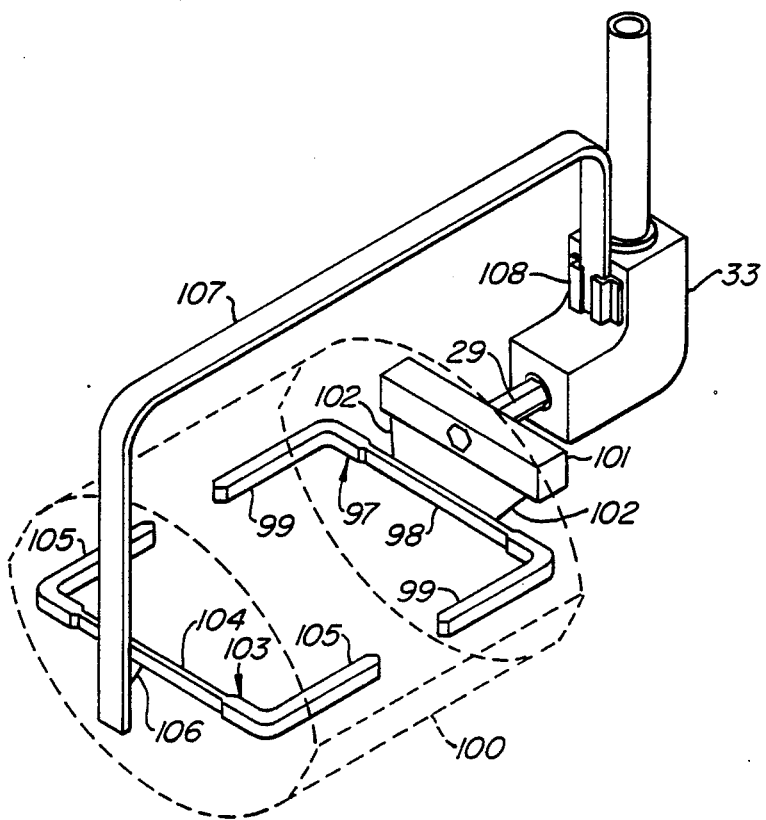
FIG._9.

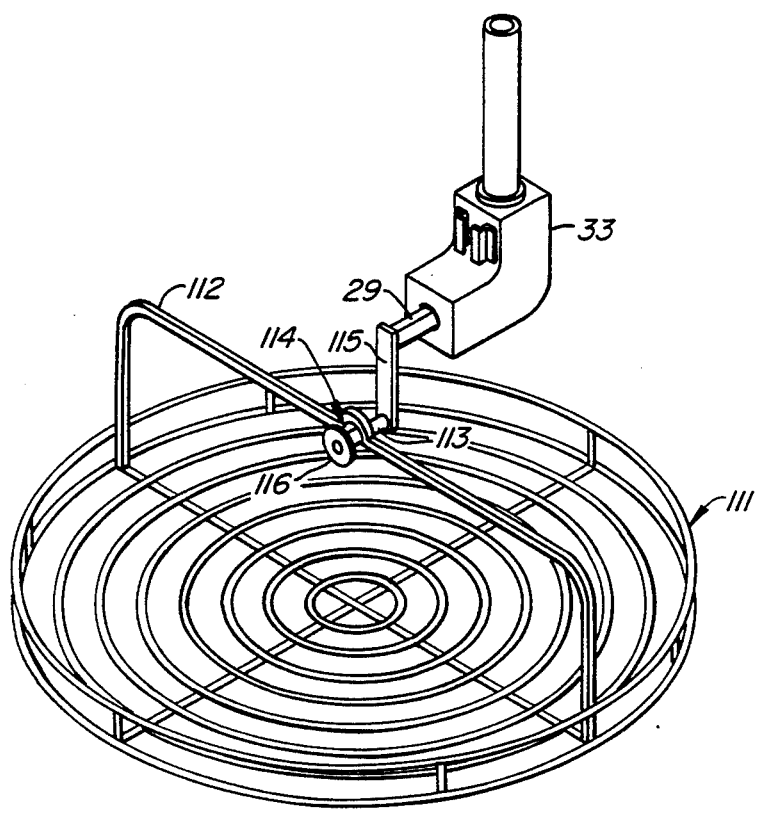
FIG._10.

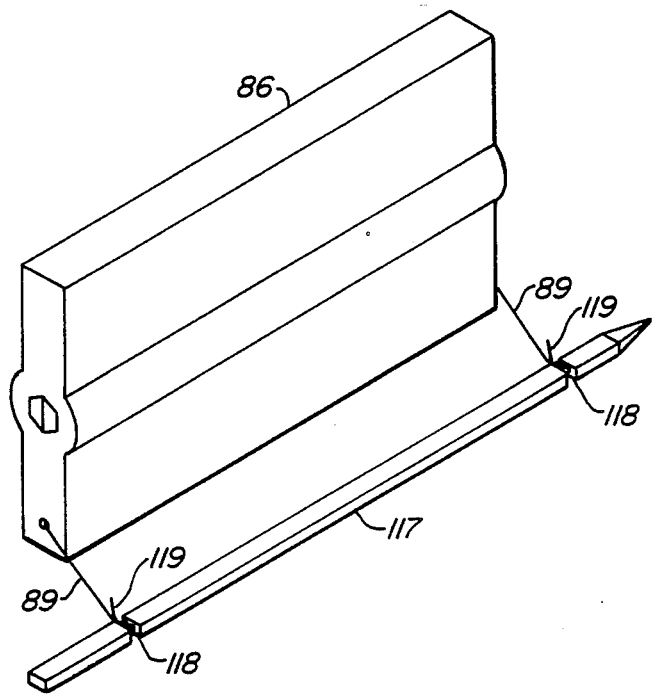
FIG.—11.

TURNING MECHANISM

This is a continuation-in-part of U.S. patent application Ser. No. 07/140,176, filed Dec. 31, 1987, now U.S. Pat. No. 4,820,054.

FIELD OF THE INVENTION

This invention relates to automatic cooking apparatus, and more specifically to an automatic mechanism for turning a food item such as a steak, filet of fish, roasts of meat, whole fowl or the like during cooking.

BACKGROUND OF THE INVENTION

U.S. Pat. No. 4,649,810 issued to Wong and entitled "Automatic Cooking Apparatus" discloses an integrated cooking apparatus for automatically preparing culinary dishes. In one embodiment of that invention, the recipe ingredients are pre-loaded into a compartmentalized carousel, which rotates on command under the control of a microprocessor to bring the appropriate compartment into position for dispensing its ingredients into a cooking vessel. The ingredients are then heated, stirred, covered and uncovered automatically according to a prescribed recipe. For such an automatic cooking apparatus to be able to reproduce a variety of dishes with the delicacy of the accomplished cook, the automatic stirring mechanism must be able to stir, mix, turn, or agitate the ingredients in the manner of the live cook.

In the course of preparing a dish, a cook may be called upon to perform a range of complex motions referred to by such various terms as stirring mixing, turning, folding, blending, or flipping. Where it is not necessary to distinguish among them, such motions are often referred to herein simply as "stirring."

Manual stirring with a fork, spoon, spatula, or the like, may involve a complex motion. Depending upon the recipe and the nature of the food ingredients, the stirring implement may be moved in any one of a variety of patterns, which are difficult to reproduce by mechanical apparatus, and especially by a low-cost compact mechanical apparatus suitable for use with a typical cooking vessel of the type found in a domestic kitchen.

In the stirring mechanism disclosed in U.S. Pat. No. 4,649,810, for example, the action is produced by a blade generally conforming to the shape of the bottom of the cooking vessel. The blade is mounted on a vertical shaft at the center of the vessel, and the shaft is coupled to a motor drive providing the rotational force. As the blade revolves around the vertical axis defined by the shaft, it moves along the bottom and pushes the ingredients along, causing the ingredients to spread and to roll over the top of the blade.

This type of blade and mechanism will perform adequately for many recipes. However, it does not stir the ingredients quite in the same manner as a chef would, and for certain types of softer ingredients it may tend to break up or disfigure the ingredients excessively, adversely affecting the appearance and texture of the final dish.

Other automatic stirring mechanisms are known, but these generally call for awkward mechanical arrangements or are designed for specialized situations. One such stirring mechanism, intended for Chinese cooking with a wok, is disclosed in U.S. Pat. No. 4,503,502 to Chapin entitled "Method and Apparatus For Automated Chinese Stir-Fry Cooking." In that mechanism a small shovel-like implement is moved up and down in a vertical plane by a camming arrangement while another arrangement rotates the whole wok underneath the shovel. The resulting motion is such that the ingredients lying in the path of the shovel are "tossed" into the air a shovel-full at a time.

Another known stirring mechanism, for use with a special cooking pot, is disclosed by Wallman in U.S. Pat. No. 3,905,585 entitled "Agitating Device." The Wallman mechanism is mounted on the rim of the pot, which includes a special lip for this purpose. A shaft extends into the pot and terminates in a comparatively small, fixed stirrer. The mounting mechanism is structured such that the shaft rotates about its axis and simultaneously is "walked" around the perimeter of the pot. The rotating stirrer produces a localized circular stirring action as it is carried around the pot perimeter.

The Wallman device is awkward in that it requires a pot formed with the proper lip for mounting the device, which takes up much space about the rim. So, for example, the pot would be difficult to cover while the Wallman device is in position. Moreover, while the Wallman device may be suitable for agitating liquids, it does not reproduce the full effect of a stirring action such as might be used, for example, in quick-stir frying of Chinese foods.

SUMMARY OF THE INVENTION

The present invention provides a particularly simple method and compact mechanism for automatically turning, or otherwise moving or manipulating a food item during cooking. A mechanism according to the present invention is able to turn the food item from one side to another following the same type of turning action conventionally provided manually by the chef. The method is applicable for automatically flipping over such generally planar-shaped foods as steaks, hamburgers, and fish filets as well as for automatically turning bulkier items such as roasts or fowl.

The invention is driven by a horizontally rotating drive shaft such as the drive shaft disclosed in my co-pending U.S. patent application Ser. No. 07/140,176 filed Dec. 31, 1987. Briefly, according to the invention a food item may be automatically turned about the horizontal rotation axis by a mechanism which provides a moment arm extending generally perpendicular to said horizontal axis. The moment arm is flexibly linked to the food item at an end of the food item, the link being made at one or more positions spaced apart from the horizontal rotation axis. The moment arm is then automatically rotated about the horizontal axis so as to drag the food item about the horizontal axis.

The turning mechanism of the invention is particularly suited for use with the automatic cooking apparatus disclosed in U.S. Pat. No. 4,649,810, described above. However, it may also be used with other automatic cooking arrangements or, as described above, as a stand-alone device associated with an appropriate drive mechanism.

Other aspects, advantages and novel features of the invention are described hereinbelow or will be readily apparent to those skilled in the art from the following specifications and drawings of an illustrative embodiment.

BRIEF DESCRIPTION OF THE DRAWINGS

FIG. 1 is a perspective view of an automatic cooking apparatus for use with the present invention.

FIG. 2 is a cross-sectional view of a first embodiment of apparatus for use with the invention.

FIG. 3 is cross-sectional view of an alternative embodiment of apparatus for use with the invention.

FIG. 4 is a perspective view of a mixing/turning implement.

FIG. 5 is a side elevational view showing a sequence of positions of the mixing/turning implement of FIG. 4 in one mode of operation.

FIG. 6 is a perspective view of a whipping implement.

FIG. 7 is a perspective view of an implement according to the invention for use in automatically turning such generally planar items as steaks, hamburgers, or fish filets.

FIGS. 8A-F provide a sequence of side elevational views illustrating the operation of a turning implement as in FIG. 7.

FIG. 9 is a perspective view of an implement according to the invention for turning bulky items such as roasts, or whole fish, or fowl.

FIG. 10 is a perspective view of an implement for use in automatically raising or lowering ingredients for timed boiling, or deep-fat frying, or the like.

FIG. 11 is a perspective view of an alternative embodiment of an implement for flipping a steak.

DETAILED DESCRIPTION OF SPECIFIC EMBODIMENTS

For the sake of illustration, the invention will be described in the context of an automatic cooking apparatus of the type disclosed in U.S. Pat. No. 4,649,810. FIG. 1 illustrates such a cooking apparatus, including a cooking vessel 10 resting on heating means 11 and a compartmentalized dispensing structure 12 in the form of a rotatable carousel for holding and dispensing the culinary ingredients called for by a prescribed recipe into the cooking vessel 10. A stirring mechanism 13 according to the invention extends into the vessel 10 for automatically mixing the ingredients. The carousel 12 and stirring mechanism 13 may be driven by one or more drive motors (not shown) housed in the apparatus and under the control of an on-board microcomputer.

FIGS. 2 and 3 show two different embodiments of a mechanism for use with the invention. The mechanism includes an implement 15 for manipulating the ingredients in the vessel, a means indicated generally by the bracketed portion 16 for rotating the implement 15 about a horizontal axis 17, and a means indicated generally at 18 for rotating the implement 15 about a vertical axis 19. In the embodiment of FIG. 2 the rotations about the horizontal and vertical axes 17 and 19 may be driven independently of one another in any ratio or phase relation. FIG. 3 shows an alternative embodiment in which the horizontal and vertical rotations are in predetermined relation to one another.

The implement 15 illustrated in FIGS. 2 and 3 is in the form of an elongate curved blade member. The blade is disposed so that as it is rotated about the horizontal axis 17, it contacts the ingredients in the pot and "stirs" them with a turning motion. With the curved profile shown in FIGS. 2 and 3, the blade can operate to scoop up and turn over scoopfuls of ingredients. A flat blade could also be used to provide a beating or mixing motion much like the motion that a cook follows in beating or mixing ingredients with a fork by holding the fork at one general location over a pan and imparting a small circular motion to the fork about a generally horizontal axis using a wrist action. The implement 15 can assume a number of other forms for manipulating the ingredients in various ways, as will be described below.

With reference now to FIG. 2, the stirring means is supported by a support structure 20 and is held in position by bracket 21 on the underside of the support structure 20. A coaxial drive shaft comprises an inner drive shaft 23 and an outer cylindrical drive shaft 24. These two concentric drive shafts are each mounted for rotation about the vertical axis 19. The rotation of the shaft 24 is used to produce a stirring/dragging motion about the vertical axis, and the rotation of the inner shaft 23 is converted to a rotary motion about the horizontal axis 17 to produce the turning (or rolling or flipping) motion, as will be described more fully below.

The outer cylindrical shaft 24 is secured to an offset gear housing 25 such that the housing 25 rotates together with shaft 24. Housing 25 houses a pair of intermeshed offset gears 26 and 27, which serve to displace horizontally the vertical rotation produced by inner drive shaft 23. Offset gear 27 drives vertical shaft 28, which forms a horizontally displaced extension of the shaft 23.

The rotary motion of the vertical shaft 28 is transferred to a rotary motion of horizontal shaft 29 by angle-conversion means indicated generally at 30 and comprising a pair of bevel gears 31 and 32 included in elbow housing 33. As illustrated, the bevel gears are in 1:1 ratio; however, other ratios could be employed. The rotary motion of horizontal shaft 29 is used to drive the horizontal axis turning motion of the implement 15. The shaft 28 is housed within a cylindrical extension tube 34 secured at its ends to the offset housing 25 and elbow housing 33. The extension tube 34 isolates the shaft 28 and gear movements from the cooking environment. The length of the tube 34 may also be selected so as to determine the disposition of the horizontal axis 17 above the bottom of the cooking vessel and hence the permissible height of the rotating implement 15. The bevel-gear housing 33 is provided with a locking ring 35. The housing 33 may be locked to the extension tube 34 at any desired angular disposition with respect to the offset housing 25. The extension tube 34 and shaft 28 may also be configured so as to be selectively removable and interchangeable with shafts of different lengths so as to adjust the height of the implement 15 about the bottom of the pan.

In operation, the blade 15 undergoes two independently controllable rotary motions. The blade rotates in a vertical plane about the horizontal axis 17, and the blade as well as the angle-conversion means 30, vertical shaft 28, and offset gear housing 25, all revolve about the vertical axis 19.

FIG. 2 illustrates a mechanical arrangement providing two rotational couplers for separately driving the concentric shafts 23 and 24 and hence the two rotary motions of the implement 15. The first comprises a hexagonal linking shaft 36 coupled to drive pulley 37. The hex shaft 36 is keyed to the inner vertical shaft 23 by key 38, and the drive pulley 37 presents a drive surface 39 for coupling to a drive motor. The drive pulley 37 rides on a doubly cylindrical bearing member 40, which provides the bearing surface for the drive pulley. The bearing member 40 itself rides on a journal support bearing 41, which is fixed to the support member 20 and which extends upwardly between the two cylindrical portions of the bearing member 40. Thus, rotation of the pulley 37 causes the linking shaft 36 to rotate, which in turn rotates the shaft 23, which drives the turning motion of the implement 15 about the horizontal axis 17.

The other rotary motion of the implement 15 is produced by rotation of outer shaft 24. The shaft 24 is keyed to an intermediate coupling ring 42, which in turn is keyed to the bearing member 40. Positioned about the hex shaft 36 is a compression spring 43, which urges the coupling ring downward. Pressed onto the outer surface of bearing 40 is an annular drive gear 44. The gear 44 presents a drive surface 46 for coupling to a drive motor. Thus, rotation of the gear 44 rotates the bearing member 40, which in turn rotates the outer vertical shaft 24 through the intermediate coupling ring 42. The outer shaft 24 drives the entire housing 25 about the vertical axis 19.

The rotational couplers just described permit the entire stirring mechanism to be removed for cleaning, storage or other purpose as follows. Hex shaft 36 is formed with a horizontally extending pin on the lower portion of key 38. When hex shaft 36 is pulled upward, this pin engages the bottom surface of coupling ring 42 so as to urge the coupling ring upward against the tension of compression spring 43, thereby disengaging the coupling ring from shaft 24. The entire mechanism can then be slid horizontally from the supporting bracket 21.

The rotational couplers described above present the two surfaces 39 and 46 for coupling to a drive mechanism for driving the two rotary motions of the implement 15. These may be driven, for example, by two independent belt drives and motors. Alternatively, one or both of the surfaces 39 and 46 may be coupled through an appropriate gear train to a Geneva drive mechanism. A Geneva mechanism may be beneficially coupled to the surface 39, for example, to produce an intermittent rotation of the implement about the horizontal axis. A drive mechanism, which may be adapted for use with the present invention is disclosed in my U.S. Pat. No. 4,779,522 issued Oct. 25, 1988, the disclosure of which is incorporated herein by reference. That patent also discloses rotational couplers like those illustrated in FIG. 2.

A feature of the above apparatus is that it may be effectively dimensioned for use with conventionally sized pots and pans in a domestic kitchen. Such vessels typically have an effective cooking diameter of twelve inches or less and may have side walls ranging in height from one or two inches for a frying pan to twelve inches or so for a kettle. In a preliminary prototype of the embodiment of FIG. 2, for example, the offset housing 25 was constructed with overall dimensions of $1 \times 3\frac{1}{4} \times 1\frac{1}{2}$ inches, which was used with a ten-inch diameter pot.

In the embodiment of FIG. 3, both rotary motions of the implement 15 are driven by rotation of the single vertical shaft 51, which is coaxial with the vertical axis 19. The shaft 51 passes through a bearing 52, which is mounted within an anchor member 53. The anchor member 53 is fixed to gear housing 54 so that the member 53 remains stationary with respect to the housing. As in the embodiment of FIG. 2, the housing 54 serves to provide an offset for the vertical shaft 51. The vertical extension shaft 28, protective extension tube 34, angle-conversion means 30, horizontal shaft 29, and the implement 15 are the same in FIG. 3 as in FIG. 2 and are given like reference numerals.

The housing 54 is divided into two chambers. The upper chamber includes a gear train for driving the rotation about the vertical axis 19. The lower chamber includes a second gear train for driving the horizontal rotation and for fixing the ratio of horizontal rotation to vertical rotation.

The vertical shaft 51 carries gear 56 and 57 at its lower extremity. The gear 57 engages a larger torque gear 58. A smaller gear 59 is coaxial with the gear 58 and is fixed to gear 58 so that they rotate together. The anchor member 53 is formed with a stationary spur gear 61 at its lower extremity, which engages the gear 59. As the gear 59 rotates, it causes a rotation of the spur gear 61 about the vertical axis 19. Since the spur gear 61 is a part of the anchor member 53, and since the anchor member is fixed to the housing 54, as the gear 59 turns, it causes the entire housing 54 to rotate about the axis 19. Because of the relative ratios of the gears 57, 58, 59, and 61, multiple rotations of the drive shaft 51 will generally be required to produce a full rotation of the housing 54. Those skilled in the art will readily be able to select appropriate gear ratios to develop the desired torque and housing rotation speed.

The rotation of vertical drive shaft 51 is transferred to the lower chamber of the housing 54 by the coaxially mounted transfer coupling gears 66 and 67. The coupling gear 66 meshes with the gear 56 on shaft 51 in the upper chamber, and the gear 67 meshes with the torque gear 68 in the lower chamber. The torque gear 68 drives a Geneva drive mechanism for intermittently rotating the horizontally displaced vertical shaft 28. The torque gear 68 is coaxially mounted with a Geneva driver 69, which intermittently engages a Geneva wheel 70.

The Geneva driver 69 includes a drive pin 71 and locking ring 72. The drive pin engages drive slots of the Geneva wheel for rotating the wheel, and the locking ring engages the arcuate perimeter of the Geneva wheel to hold it stationary between indexed positions. The structure and operation of a Geneva mechanism is conventional and will not be described further here. Coaxially mounted with the Geneva wheel 70 is another coupling gear 73, which meshes with the drive gear 74 directly coupled to the shaft 28.

The ratios of the gears 73 and 74 may be chosen so that the manipulating member 15 undergoes a specified number of revolutions or fraction of a revolution about the horizontal axis 17 per indexed rotation of the Geneva wheel 70. For example, assuming the angle-conversion gears have a ratio of 1:1, then if the Geneva wheel rotates through 90 degrees for one indexed position, a gear ratio of 4:1 will produce a 360 degree rotation of the manipulating member. The specific angle through which the implement 15 should be rotated will, of course, depend on the nature of the implement 15 and the stirring or manipulating motion desired. The number of horizontal rotations of the implement 15 per full revolution of the housing 54 about the vertical axis 19 will be determined by the number of indexed positions of the Geneva mechanism and the ratios of the gears 56 to 66 and 67 to 68. These ratios may also be selected to optimize the torque delivered to the implement 15.

To serve the object of providing an apparatus usable in a domestic kitchen, the apparatus must, of course, be dimensioned to fit within conventional pots and pans as found in a domestic kitchen. The embodiment of FIG. 3 was constructed in a preliminary prototype having an offset housing 54 with overall dimensions of $2\frac{1}{2} \times 4\frac{5}{8} \times 3$ inches.

A variety of manipulations of the ingredients in the cooking vessel can be achieved with the horizontal and vertical axes of revolution of the above embodiments. A basic stirring or mixing motion may be achieved with the use of an implement such as shown in FIG. 4. The implement of FIG. 4 is formed with a shank portion 76, which is adapted at one end for attachment to the horizontal shaft 29 rotating about the horizontal axis 17 in FIG. 2 or 3. In particular, the shank portion 76 is adapted so that it can be mounted perpendicular to the horizontal rotation axis. Secured to the other end of the shank portion 76 is a slightly curved blade member 77, which may be provided with a flexible or resilient scraping edge 78. Suitable plastics or other materials for fabricating cooking utensils are well known in the art and will not be described here. The blade member 77 may also be provided with other forms of scraping edges or attached scraping implements. For example, a separate, deflectable scraping blade may be biased against the blade member 77 so as to absorb any impact and provide an amount of "give" when the blade hits hard ingredients.

In operation, the implement of FIG. 4 is rotated about the horizontal axis in a direction so that the scraping edge is the leading edge. The horizontal rotation axis and the curvature of the implement are so configured that the blade member contacts the bottom of the pan at an angle suitable for engaging the ingredients. In so doing, the curved blade member scoops up the ingredients immediately in its path and with continued rotation flips the ingredients over.

The rotation of the flipping/turning implement about the horizontal axis may be correlated with the rotation about the vertical axis in a number of ways. The implement may be continuously rotated about the horizontal axis as that horizontal axis is slowly rotated about the vertical axis to move the implement over the entire bottom of the vessel. Alternatively, the implement may be rotated intermittently through a single 360 degree rotation. If the rotation about the horizontal axis is sufficiently faster than that about the vertical axis, the implement will effect a local turning/mixing action in a localized region of the pan, and then will be swept to another portion of the pan to continue the turning/mixing action. To assure thorough mixing of the ingredients, the mechanism can be adjusted so that the activating position of the horizontal-axis rotation will be different within successive vertical rotation cycles of the whole assembly. For example, the horizontal and vertical rotations may be correlated such that as the implement rotates four times about the horizontal axis, it will have been swept one and one-eighth revolutions about the vertical axis. In this manner, the implement will initiate its turning/mixing action in slightly different locations on the bottom of the pan during successive revolutions.

Another useful mixing/turning action may be achieved with the implement of FIG. 4 by introducing an interruption or "drag" in the horizontal-axis rotation of the implement. This motion is described with reference to FIG. 5, which shows an elevational view of the mixing/turning implement in several positions as it is swept across the bottom of a pan 79. For the sake of illustration, the several successive positions of the implement are shown in a straight line, although in reality they would follow a circular motion around the vertical axis of revolution. At the position indicated generally at reference numeral 81a, the implement is brought into an angular disposition with respect to the bottom of the pan for engaging the ingredients. The implement is maintained at this predetermined angular disposition through the positions 81b-c for a predetermined angular sweep about the vertical rotation axis, which is sometimes referred to herein as the dwell or drag of the implement. In this disposition the implement sweeps up the ingredients lying in its path throughout the whole dwell period. The implement then undergoes a complete 360 degree revolution as indicated at 82. At position 83, the implement is shown positioned again to sweep up the ingredients lying in the next dwell path. At position 84 the implement undergoes another horizontal-axis rotation for flipping the ingredients just swept up.

A variety of other implements may also be used to advantage with the apparatus disclosed herein to produce manipulations other than pure "stirring." For example, the apparatus may be used with a whipping or beating implement such as shown in FIG. 6. The whipping implement is formed much in the manner of a conventional egg beater, except that it is preferably formed with individual elongate whipping elements 85, which are "squared off" at their ends, as illustrated in FIG. 6 for a flat-bottomed pan, to conform generally to the shape of the pan and to provide greater reach in the radial direction of the pan. Of course, if the pan has a curved bottom, then the stirring elements 85 should be shaped to conform to the general radial profile of the bottom of the pan.

FIG. 7 shows a manipulating implement which may be used to flip a steak, hamburger, filet of fish, or the like. The flipping implement includes a flipping member 86, which is preferably in the form of a generally flat, elongate member. The member 86 is adapted at its midportion, as indicated generally at 87, to be secured to, and driven by, the horizontal rotating shaft 29. In the embodiment illustrated in FIG. 7, the implement includes a wire cage or net 88 for holding the food to be flipped. The cage 88 may be formed of either a flexible or a semi-rigid construction in a grid pattern having a grid size appropriate to the nature of the food to be flipped, or may be formed also in a non-grid pattern. For example, for use with a softer, more delicate fish, the grid size would be smaller to provide the needed stability during flipping. The cage 88 may be opened to receive the steak, burger or the like, and then clamped shut. In the embodiment of FIG. 7, the cage 88 is attached to the flipping bar 86 by flexible fibers or cables 89. The food is loaded into the cage 88, and the cage together with the food is placed on the pan so as to cook one side of the food.

As illustrated in FIG. 7, the supporting cage 88 is linked to the flipping bar 86 by two filamentous fibers 89. The linkage may also be established by other flexible means such as hinged members or chain links. Given the benefit of the present disclosure, other means will readily occur to those skilled in the art. The linkage means 89 is flexible to provide a certain amount of slack, or "play," in the coupling between the supporting cage and the turning member 86. With this slack in the linkage, the apparatus does not interfere with the disposition of the food item on the cooking surface during cooking. The food item rests in its cooking position under its own weight. The linkage 89 comes into play only during turning. The linkage serves to drag the food item about the horizontal rotation axis.

The manner by which the flipping implement of FIG. 7 achieves its effect is illustrated with reference to the sequence of FIGS. 8A-F, which provide a side elevational view of the implement in its various positions. FIG. 8A shows a symbolic steak with first side 91 in contact with the cooking surface of the pan 92. For simplicity, the cage 88 of FIG. 7 has not been expressly shown in FIGS. 8A-F. When the flipping action is initiated, the flipping member 86 rotates in the direction of the arrow 93 and begins to lift the steak off of the cooking surface, as shown in FIG. 8B. As the flipping member 86 continues to rotate in the direction of the arrow 93, through the position shown in FIG. 8C to the inverted position shown in FIG. 8D, the steak is pulled over the horizontal rotation axis and falls so that the second side 94 lands on the cooking surface of the pan, as illustrated in FIG. 8F. Thus, the steak is flipped with a single 360 degree rotation of the flipping member 86 about the horizontal rotation axis.

It will now be appreciated that for solid cuts of meat such as a steak, the cage may be replaced by a straight rod piercing the meat at one end and attached to the flipping member 86 at its ends by the flexible fibers 89. Such an embodiment is shown in FIG. 11. The rod 117 is formed with a pointed end for piercing a steak horizontally through an end. One skilled in the art will be able to select a variety of ways of connecting the rod 117 to the turning member 86. In one such way, the rod 117 is formed with retaining grooves 118 proximate each end. Each of the fibers 89 is connected to a steel spring clip 119, which is open at one point so that it may be snapped onto the rod at the retaining grooves.

Rotation of the assembly about the vertical axis of revolution is not needed for operation of the flipping implement of FIG. 7, although such revolution can be combined with the flipping action to bring the steak or other food item to a different portion of the cooking surface of the pan. It will be appreciated that the implement of FIG. 7 can be used in other environments than the automatic cooking apparatus of the sort disclosed in U.S. Pat. No. 4,649,810. For example, the flipping implement may also be used on a barbecue grill, where it may be driven by a rotisserie device adapted for that purpose.

Another implement for turning bulkier items such as roasts is illustrated in FIG. 9. This implement includes a food-supporting means, which in the embodiment of FIG. 9 is provided by a rigid member 97, which has an elongate portion 98 carrying at least two food-piercing tines 99. In FIG. 9 the item to be turned, for example, a roast 100, is shown symbolically in phantom. Secured perpendicularly to the horizontal rotating shaft 29 is a rigid, elongate manipulating member 101. The rigid member 97 is attached to the manipulating member 101 by a pair of flexible fibers or cables 102 at either end of the elongate flipping member 101. As the horizontal shaft 29 rotates, it rotates the manipulating member 101, which applies a torque to the elongate, rigid member 97 through the flexible fibers 102. As the manipulating member 101 rotates through 180 degrees, it causes the roast 100 to turn. The length of the cables 102 is adjusted so that the roast will be brought almost to a vertical disposition, ready to flip or fall over onto its other side (i.e., rotated through about 90 degrees) before the manipulator 101 reaches 180 degrees of rotation. Then, a further incremental rotation of the manipulator 101 will cause the item 101 to flip or roll over.

For added stability, the implement preferably includes a second rigid member 103 with elongate portion 104 and food-piercing tines 105, which is inserted into the roast 100 on the opposite side from the first member 97. The second member 103 is attached by a single flexible fiber 106 to a rigid support bar 107. The flexible fiber 106 is preferably attached centrally to the rigid member 103 so as to permit free rotation about the fiber 106. The support bar 107 traverses over the roast 100 and is secured to the elbow housing 33 by bracket 108.

Those skilled in the art will now appreciate that the food-supporting means may be configured in a number of ways for supporting the roast 100 or other food item as it is turned. For example a cage or flexible netting may also be used. Moreover a variety of items may be turned in this manner, such as whole fish or fowl, or even a less bulky item such as steak. As with the implement of FIG. 7, this flipping implement may also be used on a barbecue, driven only by a horizontal rotating shaft. With this arrangement, the roast or other food item may be turned any number of times, driven by a shaft rotating in only a single direction.

The horizontal rotation axis provided by the present apparatus may also be used beneficially in such applications as deep-fat frying where it is necessary to raise the items being cooked out of the fat after a prescribed cooking time. An implement for this purpose is illustrated in FIG. 10. The implement includes a basket 111 with a handle 112. As illustrated in FIG. 10, the handle 112 is provided with a means for connection to a support arm 113. In the embodiment of FIG. 10, the handle is formed with a depression or recessed region 114. The support arm 113 is connected to the horizontal rotation axis 29 through a radial arm 115, which serves to space the support arm apart from the horizontal rotation axis. The support arm 114 is provided with a stop 116 to prevent the basket from slipping off of the support arm.

In operation, the support arm 113 is revolved about the horizontal rotation axis 17 by the action of the horizontal rotating shaft 29. As the shaft 29 rotates through 180 degrees, it raises the basket 111. This implement may also be used for such applications as automatically raising soft- or hard-boiled eggs out of the cooking water after a prescribed time.

While the above provides a full and complete disclosure of illustrative embodiments of the invention, various modifications and equivalents will occur to those skilled in the art given the benefit of this disclosure. Accordingly, the invention is not intended to be limited only to the specific examples and embodiments disclosed herein, but is defined by the appended claims.

What is claimed is:

1. An implement for use in cooking a food item such as a steak, fish filet or the like, said implement being used with a drive shaft rotating about a horizontal axis for automatically turning over said food item during cooking, comprising:

support means for supporting said food item during turning;

a turning member adapted for connection to said drive shaft so as to rotate about said horizontal axis, said turning member having a first portion extending perpendicular to said horizontal axis for connection to said support means for providing a moment arm for turning said food item and a second portion for providing leverage for lifting said food item during turning; and linkage means for flexibly linking said support means to said turning member, said linkage means being connected to the first portion of said turning member at a position spaced apart from said horizontal axis and to said support means at a position proximate an end of said food item, whereby rotation of said turning member by said drive shaft rotates said food item over said horizontal axis.

2. The implement of claim 1 wherein said support means comprises an elongate rod for horizontally piercing a steak or the like at an end thereof, said rod being adapted at the ends thereof for connection to said turning member generally parallel to said horizontal axis.

3. The implement of claim 1 wherein said support means comprises a flexible, semi-rigid cage for enclosing said food item.

4. The implement of claim 1 wherein said linkage means comprises at least one flexible linking member.

5. The implement of claim 4 wherein said linkage means comprises first and second flexible linking members connected to said support means proximate said end of said food item at opposite extremes thereof.

6. The implement of claim 4 wherein said flexible linking member is provided by a filamentous member.

7. The implement of claim 1 wherein said turning member has a generally rectangular shape and is adapted at the midportion thereof for connection to said drive shaft for rotation about an axis generally parallel to an edge of said generally rectangular shape.

8. An implement for use in cooking a food item such as a steak, fish filet or the like, said implement being used with a drive shaft rotating about a horizontal axis for automatically turning over said food item during cooking, comprising:
 support means for supporting said food item during turning;
 a turning member having a generally rectangular shape and adapted at the midportion thereof for connection to said drive shaft for rotation about an axis generally parallel to an edge of said generally rectangular shape, a first portion of said rectangular shape extending away from said horizontal axis for connection to said support means and a second portion extending opposite to said first portion for providing a lever arm for lifting said food item during turning; and
 first and second flexible filamentous linking members connected to the first portion of said rectangular shape at a position spaced apart from said horizontal axis and to said support means at a position proximate an end of said food item, whereby rotation of said turning member by said drive shaft rotates said food item over said horizontal axis.

9. An implement for use in cooking a food item such as a roast, chicken or the like, said implement being used with a drive shaft rotating about a horizontal axis for automatically turning over said food item during cooking, comprising:
 support means for supporting said food item during turning;
 a turning member adapted at the midportion thereof for connection to said drive shaft so as to rotate about said horizontal axis, said turning member having first and second oppositely extending portions perpendicular to said horizontal axis for providing moment arms for turning said food item; and
 linkage means flexibly linking said support means to said turning member, said linkage means connecting the distal ends of said first and second portions to said support means at positions proximate an end of said food item and spaced apart from said horizontal axis, whereby rotation of said turning member by said drive shaft rotates said food item about said horizontal axis.

10. The implement of claim 9 wherein said turning member comprises an elongate bar adapted for connection to said drive shaft with the elongate dimension thereof perpendicular to said horizontal axis.

11. The implement of claim 9 wherein said support member comprises a first tine member having first and second spaced apart tines for penetrating said food item at an end thereof.

12. The implement of claim 11 wherein said support member further comprises a second tine member having first and second spaced apart tines for penetrating said food item at the opposite end from said first tine member.

13. The implement of claim 12 wherein said support member further comprises a guide member adapted for mounting in fixed disposition with respect to said turning food item and a second linkage means flexibly linking said second tine member to said guide member for free rotation about said second linkage means.

14. The implement of claim 9 wherein said linkage means is provided by first and second filamentous members.

15. The implement of claim 14 wherein said second linkage means comprises a filamentous member connected to said second tine member at a central portion thereof.

16. An implement for use in connection with a horizontally rotating drive shaft for automatically turning over a steak, fish filet, or the like, comprising:
 a leverage member adapted at the midportion thereof for connection to said drive shaft so as to rotate about said midportion; and
 means for holding said steak, fish filet, or the like, said means being flexibly secured to said leverage member at a distance spaced apart from said midportion, whereby rotation of said leverage member raises said steak, fish filet or the like at an ened thereof and flips said steak, fish filet, or the like over said midportion.

17. A method of automatically turning a food item such as a steak, fish filet or the like about a horizontal axis during cooking comprising the steps of:
 providing a moment arm extending generally perpendicular to said horizontal axis;
 flexibly linking said food item at an end thereof to said moment arm at at least one position spaced apart from said horizontal axis; and
 automatically rotating said moment arm about said horizontal axis so as to drag said food item about said horizontal axis.

* * * * *